(No Model.)   J. W. HYATT.   2 Sheets—Sheet 1.

POROUS FILTER CUP.

No. 382,649.   Patented May 8, 1888.

Attest:
L. Lee.
F. G. Fischer.

Inventor.
John W. Hyatt, per
Crane & Miller, attys.

(No Model.) 2 Sheets—Sheet 2.

J. W. HYATT.
POROUS FILTER CUP.

No. 382,649. Patented May 8, 1888.

Attest:
L. Lee.
F. C. Fischer.

Inventor.
John W. Hyatt, per
Crane & Miller, Attys.

UNITED STATES PATENT OFFICE.

JOHN W. HYATT, OF NEWARK, NEW JERSEY.

POROUS FILTER-CUP.

SPECIFICATION forming part of Letters Patent No. 382,649, dated May 8, 1888.

Application filed April 19, 1887. Serial No. 235,320. (No model.)

*To all whom it may concern:*

Be it known that I, JOHN W. HYATT, a citizen of the United States, residing at Newark, Essex county, New Jersey, have invented certain new and useful Improvements in Porous Filter-Cups, fully described and represented in the following specification and the accompanying drawings, forming a part of the same.

The object of this invention is to furnish an economical construction for filtering water upon a large scale through cylindrical porous cups; and it is especially adapted for the use of such porous cups as are already found in the market for the construction of galvanic batteries. To utilize the entire or nearly the entire surface of such cups as a filtering medium, I attach their open mouths by cement to a suitable support and apply the unfiltered fluid to their exterior, drawing the filtered fluid from the interior through suitable openings and channels, which are connected together and to a common outlet. Such support is shown herein as a metallic plate, such plates being combined in pairs with an intermediate water-channel, and such pairs of plates, with the cups projecting from their opposite sides, being sustained within a filter-casing.

Figure 1:
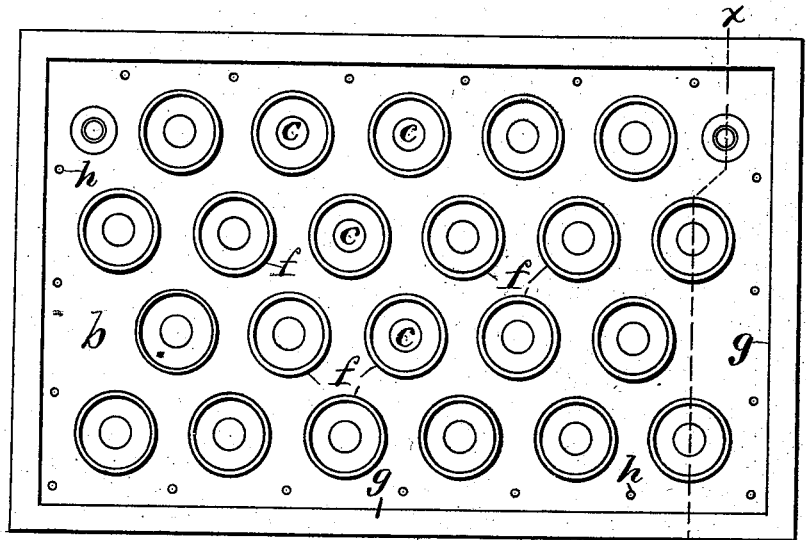
Figure 2:
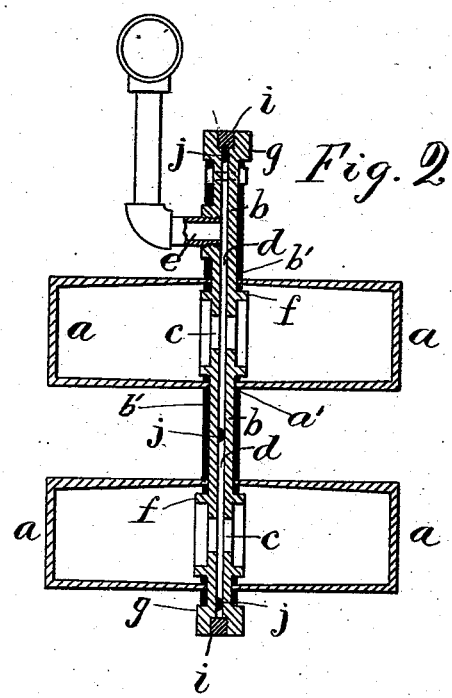
Figure 3:
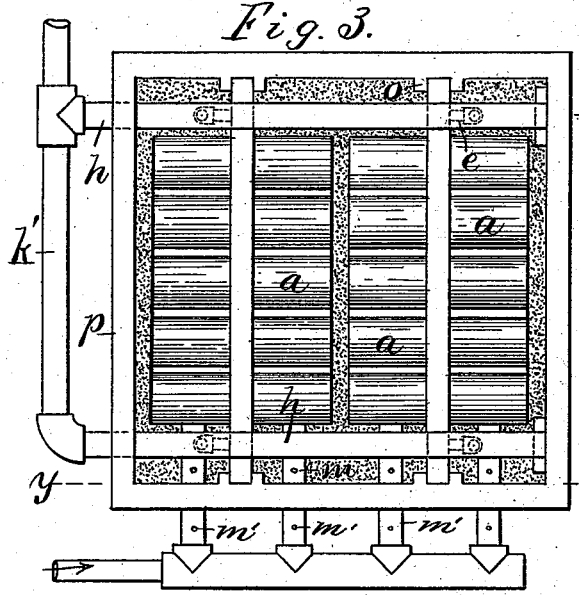
Figure 4:
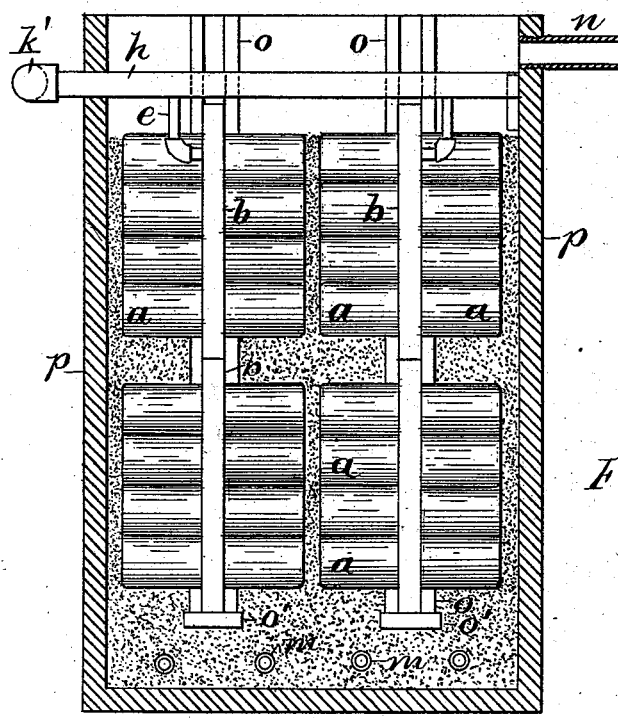

In the drawings, Figure 1 is a side view of one of the cup-plates. Fig. 2 is a transverse section of two such plates combined together, with their attached cups on line $x\ x$ in Fig. 1. Fig. 3 is a plan of a square tank containing two series of such plates; Fig. 4, a vertical section of the same on line $y\ y$ in Fig. 3, and Fig. 5 a plan of a cylindrical filter-casing with three series of such plates.

$a$ are the cups, preferably formed of porous baked earthenware, of cylindrical form, with one end closed and the annular edge $a'$ at the opposite end cemented to the supporting-plate $b$. Such plate is furnished with an aperture, $c$, opening inside each cup, and two plates being secured together with their rear sides slightly separated and their edges tightly joined, as shown in Fig. 2. The apertures $c$ open into the space $d$ between the plates, which thus forms a common water-channel for all the cups, from which channel the filtered water is drawn through pipes $e$. To center the cups upon the plate and to guard the apertures from the cement used, annular flanges $f$ are formed about the apertures $c$, and to retain fluid cement upon the plate a marginal flange, $g$, of the same height as the flange $f$, is formed around the edge of the plate. The cups may then be secured to the plate by placing the latter in a horizontal position and pouring cement, as moistened hydraulic cement, into the space between all the flanges and pressing the edges $a'$ of the cups into such cement about each of the rings $f$. The hardening of the cement then attaches the cups firmly to the plate. The rear sides of two such plates are placed together and slightly separated by studs $j$ or dabs of cement, and bolts are inserted through holes $h$ (shown in Fig. 1) to secure the plates together; and a rabbet, $i$, formed in the inner edges of the plates serves to hold a marginal packing of cement to close the joint at the edges of the space $d$. The pipes $e$ are inserted in the sides of the plates, and may, if desired, be used to suspend them in the filter-casing, as shown in the drawings; or the plates themselves may rest upon suitable supports within the filter-casing.

In Figs. 3 and 4 two series, formed each of two pairs of plates, are shown suspended in a square casing or receptacle, $p$, by the pipes $e$, which are connected by headers $k$ to a common outlet, $k'$, which is preferably connected with a suction-pipe.

The water to be filtered is introduced through pipes $m$, arranged in the bottom of the casing beneath loose sand or abrading material, $l$, placed therein, and thus serves on its passage to the various cups to be filtered to agitate such material in contact with the surfaces of the cups and to remove the impurities deposited thereon, and a waste-pipe, $n$, is provided near the top of the filter, through which the impurities accumulated within the casing may be discharged by either arresting the discharge from the outlet $k'$ and allowing the entering water to overflow, or by increasing the supply of water through the pipes $m$ without suspending the filtering operation. The pipes $m$ may, if desired, be provided with small perforations, as at $m'$ in Fig. 3, to distribute the entering fluid more effectively among the abrading material.

The cups, as shown in Fig. 1, are arranged in diagonal lines upon the plate $b$, to divert the ascending currents of water and sand against all the different sides of the cups to abrade and remove the impurities deposited thereon by the filtered water.

Figure 5:
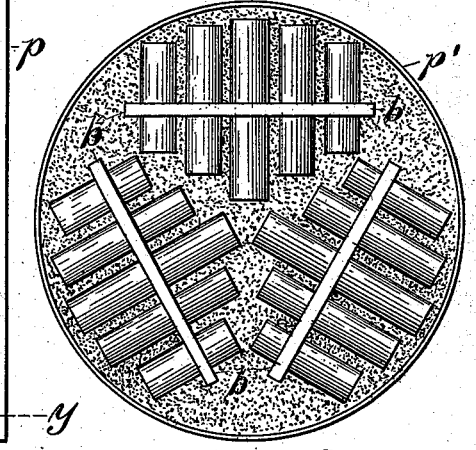

The rectangular form of the casing $p$ permits an equal projection of the cups $a$ from the outer sides of the plates $b$; but in Fig. 5 is shown an arrangement for applying the filter cups and plates to a circular casing, and maintaining the desired open passages between the cups from the bottom to the top of the filter for the passage of abrading material. In this construction three series of plates $b$ are supported within the casing $p'$ at an angle of sixty degrees with one another, and the cups are formed with varying degrees of projection from the surfaces of the plates, to avoid contact with the curve of the casing upon the outer side, and with the adjacent cups upon the inner side.

Vertical ribs $o$ are shown attached to the sides of the casing in Fig. 3, between which the pairs of plates $b$ may be readily slipped, and which serve to hold the plates at the desired distance apart to preserve a narrow space between the projecting ends of the cups upon the opposed plates.

At $o'$ in Fig. 4 a cleat is shown beneath the bottom edge of the plates, which is suitable to sustain the weight of the plates in case they are not suspended from a header, as shown in Fig. 3.

From the above description it will be seen that the ultimate object of my invention is to accumulate a large filtering area upon the exterior of such cups within as small a space as possible, so as to secure a large filtering capacity within a casing of given dimensions, and to maintain the efficiency of such a filter I use the abrading material referred to herein. Such use of abrading material has already been claimed by me in my patent application No. 219,574, filed November 23, 1886.

By my present construction I am able to render turbid waters contaminated with clay entirely clear, and to secure a large filtering surface of high efficiency in a comparatively small area.

I am aware of the state of the art shown in British Patents Nos. 6,505 of 1885, 4,726 of 1877, and 1,402 of 1880, and United States Patent No. 5,512, of 1848. I wholly disclaim the subject-matter of the said patents, and limit myself to the combination, with a perforated plate, of porous cups having their mouths attached to the plate over such apertures by cement and operated substantially as shown herein.

I am not aware of any previous construction in which porous cups have been combined together by attaching their mouths to a perforated plate, so that a large number of them might be conveniently combined together and the plate sustained vertically within a filter-casing, so as to apply an abrading material conveniently to their entire surfaces to keep them continuously closed during the filtering operation. Heretofore the filters formed of porous earthenware have required cleansing by means of brushes or scrapers, or by the removal of the porous medium from the filter, and the burning of the same to remove the impurities from its pores, whereas the arrangement of the porous cups which I have devised admits of continuously cleansing the plates by the simple and effective means claimed in my patent application No. 219,574, filed November 23, 1886. I hereby disclaim the said pending application, as the use of abrading material with my present construction would be tributary to the claim of such pending application.

Having thus set forth the nature of my invention, what I claim herein is—

1. In a filter, the combination, with a hollow filter-plate provided with a series of apertures, as set forth, of porous battery-cups attached by cement to such plate, with their mouths over such apertures, a filter-casing to inclose the plate and cups, and an outlet-pipe from the interior of the filter-plate, as and for the purpose set forth.

2. In a filter, the combination, with a series of porous cups, of a flat plate provided with apertures to withdraw the liquid from the interior of the cups, annular flanges around the apertures to fit within the cups, and flanges upon the plate exterior to the cups, and cement applied to the plate between the inner and outer flanges to secure the mouths of the cups thereto, as and for the purpose set forth.

3. In a filter, the combination, with a series of porous cups, of a flat plate attached to the mouths of the cups by cement and provided with apertures to withdraw the liquid from the interior of the cups, and annular flanges around the apertures within the cups, the apertures being arranged in diagonal rows across the plate, and the plate being sustained in a vertical position within a filter-casing having granular abrading material mixed with the unfiltered fluid and agitated by fluid introduced below the porous cups, as and for the purpose set forth.

4. In a filter, the combination, with two flat plates provided with apertures, as set forth, and attached together with an intermediate space, of annular flanges about such apertures, porous cups secured to the plate over said apertures, a casing to inclose the plate and cups, an outlet-pipe from the space between the plates, and granular abrading material mixed with the unfiltered fluid within the casing, the whole arranged and operated substantially as herein set forth.

5. In a filter, the combination, with a filter-plate provided with an internal water-space and an outlet-pipe, as set forth, of apertures in the plates connected with such water-space, porous cups secured over such apertures, and a filter-casing provided with vertical ribs upon its sides to guide and retain the plate movable in a vertical position, and granular abrading material mixed with the unfiltered fluid within the casing, the whole arranged and operated substantially as set forth.

In testimony whereof I have hereunto set my hand in the presence of two subscribing witnesses.

JOHN W. HYATT.

Witnesses:
THOS. S. CRANE,
BARTON H. COFFY.